United States Patent [19]
Hire

[11] 3,757,207
[45] Sept. 4, 1973

[54] METHOD AND APPARATUS FOR TESTING THERMOSTATIC SWITCHES

[75] Inventor: Charles John Hire, Pittsford, N.Y.

[73] Assignee: Fasco Industries, Inc., Rochester, N.Y.

[22] Filed: Jan. 10, 1972

[21] Appl. No.: 216,443

[52] U.S. Cl. .................................. 324/28 R, 73/1 F
[51] Int. Cl. ...................... G01r 31/02, G01k 19/00
[58] Field of Search .................... 324/28 R, 28 CB, 324/28 RS, 28 SE; 73/1 R, 1 B, 1 D, 1 DV, 1 F, 4 R; 346/33 R, 33 TP

[56] References Cited
UNITED STATES PATENTS
3,313,140   4/1967   Trementozzi .......................... 73/1 F Primary Examiner—Alfred E. Smith
Attorney—B. Edward Shlesinger et al.

[57] ABSTRACT

Thermostatic switches to be tested are placed in an oven containing a thermocouple connected in normal manner by two lead wires to the input of a conventional temperature recorder of the drag pen variety. Each switch is connected to one of a plurality of timer devices which control normally-open switches connected in parallel across the two lead wires of the thermocouple. As the oven temperature increases a time-temperature curve is inscribed on the chart in the recorder. As each thermostat trips it actuates its timer device, which in turn momentarily closes its associated switch to shunt the lead wires, thus causing the drag pen to shift laterally and mark a line transverse of said curve at the exact temperature the thermostat tripped. Each timer closes its switch for a different interval so that each thermostat is identified by the length of the transverse mark it causes.

9 Claims, 3 Drawing Figures

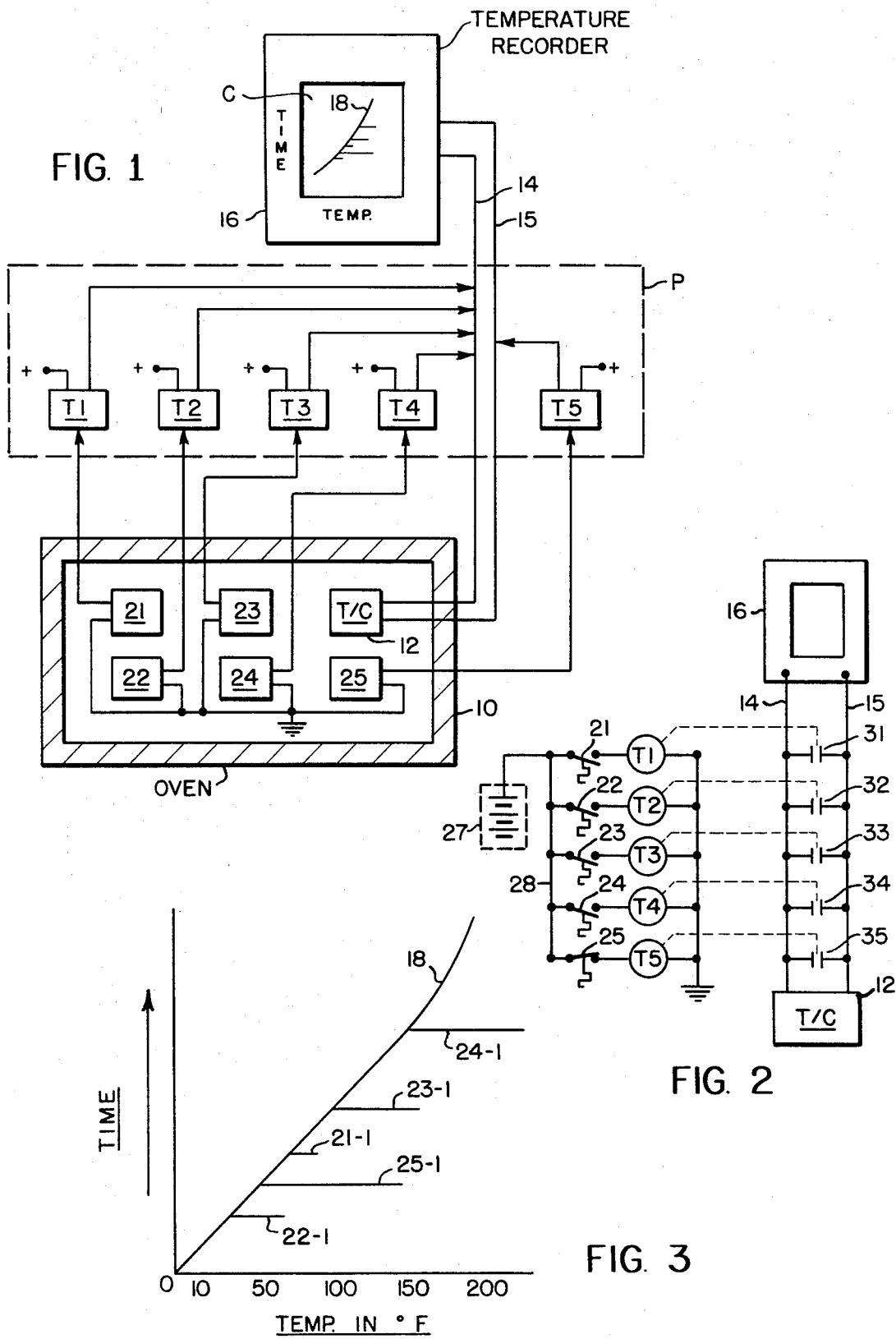

METHOD AND APPARATUS FOR TESTING THERMOSTATIC SWITCHES

This invention relates to the testing of thermostatic switches for calibration purposes and more particularly to a novel method and apparatus for detecting and recording the exact ambient temperatures at which each of a plurality of such switches opens and/or closes during the testing thereof.

Thermostatic switches are frequently employed in the electrical circuits of various types of equipment to prevent the equipment from being overloaded, for example, or otherwise to control its operation in various temperature ambients. For this reason it is conventional to calibrate different such switches to open and/or close at different ambient temperatures, depending upon their intended use. To calibrate these switches after they have been assembled, it is therefore necessary to place them, or representative samples thereof, in a controlled temperature ambient, such as an oven or refrigerating device, for example, to vary the ambient temperature sufficiently to cause the tested switches to operate by moving from normally open to closed positions, or vice versa. The exact temperatures at which the switches operate are then noted, and if not satisfactory (i.e., do not meet the necessary specifications), the switches are recalibrated.

One such testing system heretofore has comprised the steps of placing the switches in an oven, for example, with each switch connected to a different one of a plurality of lamps that are located on the outside of the oven. A thermometer or thermocouple-operated temperature recording device is viewable by an operator for determining the temperature inside the oven at any instant. The oven temperature is then increased gradually while the attendant observes the lamps, and records manually the exact temperature at which each switch opens, or closes, as determined by the corresponding deenergization, or energization, of its associated lamp.

A major disadvantage of this testing system is that it requires the attendance of an operator at the oven at all times during a test period, and introduces possible human error. The operator could be eliminated by combining, for example, a thermocouple-operated temperature recorder with an event recorder or a data acquisition computer with a print-out, but these latter two methods lack accuracy and are extremely expensive and complex.

It is an object of this invention to provide an improved method of determining and automatically recording the exact temperatures at which thermostats of the type described are tripped or operated during exposure to a changing temperature ambient.

Another object of this invention is to provide an improved method of the type described which eliminates the need of employing an attendant for recording the temperatures at which thermostats under test are operated.

Still another object of this invention is to provide improved means for testing and automatically recording the operating points of switches that are calibrated to operate in response to predetermined changes in an external or ambient condition thereof.

A further object of this invention is to provide improved testing and recording apparatus for providing an automatic and permanent record of the exact temperatures at which various thermostats under test are caused to operate.

Other objects of the invention will be apparent hereinafter from the specification and from the recital of the appended claims, particularly when read in conjunction with the accompanying drawing.

In the drawing:

FIG. 1 is a schematic view of apparatus employed in accordance with one embodiment of this invention for testing the operating points of termostatic switches;

FIG. 2 is a wiring diagram illustrating one manner in which this apparatus may be wired to perform its desired function; and FIG. 3 is an enlarged, graphical representation of the time-temperature curve that is formed by part of this apparatus when used for testing thermostatic switches.

In a preferred embodiment of this invention, a plurality of thermostats are placed in a testing oven containing a thermocouple, which is connected in a conventional manner to the input of a standard temperature recorder of the drag pen variety. The recorder includes the usual strip chart, which is advanced alowly as the temperature of the oven increases so that the recorder's drag pen or stylus inscribes a time-temperature curve on the chart in known manner. As each thermostat trips, it operates one of a plurality of conventional timers, which control time delay switches that are connected in series with, or in parallel between, the thermocouple leads. Upon being operated, each timer closes or opens its associated time delay switch for a predetermined, different interval, so that as each timer is operated the thermocouple leads are shorted or opened momentarily. This causes the drag pen to reciprocate laterally to one side or the other of its normal time-temperature curve, thus forming a transverse line which intersects the normal time-temperature curve at a point corresponding to the exact temperature at which the associated thermostat tripped. The extent of the lateral travel of the pen is proportionate to the interval of time that the associated time delay switch is operated, and hence the lengths of the transverse lines produced on the chart by the pen are used to identify the associated thermostats.

Referring now the the drawing by numerals of reference, and first to FIG. 1, 10 denotes a conventional chamber or testing oven containing a standard thermocouple element 12, which is connected in known manner by the wires 14 and 15 to the input of a conventional temperature recorder 16 of the drag pen variety. The recorder contains the usual paper strip or chart C, which is advanced in known manner by a motor (not illustrated) to inscribe a temperature-time curve 18 on the face of chart C.

Before raising the oven temperature a plurality of thermostatic switches, for example the five switches 21, 22, 23, 24 or 25 shown in block form in FIG. 1, are placed in the oven, and are connected to a like plurality of timers or time delay switching devices T1, T2, T3, T4 and T5, which may be mounted on terminal board or panel P (broken lines in FIG. 1) at the exterior of the oven.

As shown in greater detail in FIG. 2, switches 21, 22, 23, 24 and 25 may be connected at one side by line 28 to the positive terminal of a direct current power supply, such as a battery 27 or the like. At their opposite sides switches 21, 22, 23, 24 and 25 are connected through the operating sides of the timer devices T1, T2, T3, T4 and T5, respectively, to ground. For purposes of illustration, the switches 21 to 24 are shown to be normally-open switches (FIG. 2), while switch 25 is illustrated as a normally-closed switch. Timer devices T1, T2, T3, T4 and T5 control normally-open switch contacts 31, 32, 33, 34 and 35, respectively, which are connected in parallel between the thermocouple output leads leads 14 and 15.

Whenever one of the timer devices T1, T2, T3, or T4 is energized by the closing of its series connected thermostatic switch 21, 22, 23 or 24, respectively, the associated timer switch contacts 31, 32 33 or 34 are momentarily closed for a predetermined interval of time, depending upon the setting or specification of the associated timer device. Device T5 is similar to the devices T1 through T4, except that it is energized or enabled only when the series connected thermostatic switch 25 is opened, at which time timer T5 momentarily closes the switch contacts 35 for a predetermined interval. The exact construction of the timer devices T1 through T5 form no part of this invention, and therefore will not be described in greater detail herein.

In this illustrated embodiment, each time one of the sets of time delay contacts 31 through 35 closes, the thermocouple leads 14 and 15 are shunted, thereby interrupting the temperature indicating signal normally applied to the recorder. This has the effect of applying to the recorder a second signal, which causes the recorder drag pen momentarily to reciprocate laterally relative to the normal time-temperature curve 18, as described in greater detail hereinafter.

In operation, the timer devices T1 through T5 are selected or adjusted to cause their associated time delay switch contacts 31 through 35 to close for different time intervals, when the associated timer device is energized. For example, device T1 may be selected to cause its contacts 31 to close for one millisecond each time the associated thermostatic switch 21 is moved to its closed position. Devices T2, T3 and T4 may be selected to close the associated switch contacts 32, 33 and 34 respectively, for two, three and four millisecond intervals, respectively, each time that the associated thermostatic switch 22, 23 or 24 is closed. Device T5 may be selected to close the switch 35 for a five millisecond interval each time switch 25 is opened.

Assuming that the trip temperatures of the switches that are to be tested lie in a temperature range from, for example, 32° F to 200° F, it will be apparent that the oven or chamber 10 must have the ability of changing its temperature at least between these limits.

After the switches that are to be tested have been placed in the oven 10, and connected to the associated timer devices as described above, the temperature recorder 16 is energized or activated in known manner; and the temperature in the oven is gradually increased from a lower toward an upper limit to effect a corresponding elevation in the ambient temperature of switches 21 to 25. Thereafter as each of these switches is tripped upon reaching its critical temperature, the associated timer controlled switch 31, 32, 33, 34 or 35 is momentarily closed and the signal produced by the now-shunted thermocouple leads 14 and 15 causes the drag pen of the recorder mementarily to shift laterally relative to curve 18 on the chart C for a distance directly proportionate to the interval of time during which the associated timer controlled switch is closed. These lateral deflections are denoted in FIG. 3 by the lines 21–1, 22–1, 23–1, 24–1 and 25–1, and correspond, respectively, to the time delay intervals of one, two, three, four and five milliseconds. Moreover, the point at which each of these lines intersects the normal time-temperature curve 18 indicates the exact temperature at which the associated thermostat was tripped.

For example, the test results as embodied in the portion of the chart C graphically illustrated in FIG.3 indicates that switch 21, as represented by line 21–1, opened at an ambient temperature of approximately 60° F, while switch 22, as represeneted by line 22–1 (twice the length of line 21–1) previously opened at a temperature ambient of approximately 40° F. Line 25–1, which is five times the length of line 21–1, shows that switch 25 opened at a temperature ambient of approximately 51° F. Line 23–1, which is three times the length of line 21–1 indicates that switch 23 opened at approximately 100° F; while line 24–1, which is approximately four times the length of line 21–1, indicates that switch 24 opened at an ambient temperature of approximately 149° F. Thus, by correlating a different time delay element with each of the thermostatic switches that are to be tested, the exact temperatures at which the various switches are tripped will be permanetly recorded on the chart C at the points where the various lateral spikes or lines 21–1 to 21–5 intersect the normal time-temperature curve 18.

From the foregoing it will be apparent that the instant invention provides a relatively simple method of recording the critical trip temperatures of a plurality of different thermostatic switches. Moreover, by utilizing a relatively simple time delay interface between the switches and a conventional temperature recorder, the invention has obviated the need for employing expensive and complex recording equipment, or the need for an attendant to record manually the temperatures at which the various switches trip.

A major advantage of this invention is that through the use of relatively inexpensive time delay relay devices, a conventional temperature recording device can be modified automatically to provide a permanent record of the exact temperatures at which the tested thermostats trip. Moreover, it does not take any great skill or intelligence to operate the testing equipment or to analyze the results recorded on the chart C. For example, the exact lengths of the lateral spikes or lines 21–1 through 25–1 are not particularly significant, it being necessary only that these lines be noticeably different in length, and be associated with a different one of the thermostatic switches under test. It therefore is not necessary to modify in any manner the temperature recorder 16, or the chart C upon which the record is recorded. While the invention has been described in connection with the testing of thermostatic switches by use of a thermocouple for detecting temperature changes, it will be apparent to one skilled in the art that the disclosed apparatus may be readily modified to identify or record events detected by elements other than thermostatic switches, for example switches that are responsive to changes in ambient pressure, flow, PH, and the like. Moreover, while this invention has been described in connection with the testing of only five thermostatic switches at a time, it will be apparent, of course, that more or less than this number can be tested at one time, provided of course that each such switch is connected to a separate time delay element having a different time delay interval.

In the case of most temperature recorders of the type denoted at 16, the associated stylus also will be deflected laterally from the normal time-temperature curve 18 whenever one of the associated thermocouple lead lines 14 or 15 is opened, and usually in a direction opposite to that in which the stylus is deflected when one of the switches 31 to 35 is closed to short out these lines. Therefore, the method could also be practiced by connecting switches 31 to 35 in series with one of the lines 14 or 15, in which case, however, these timer-controlled switches would be of the normally-closed variety, so that upon the opening of any one thereof in response to the tripping of the associated thermostat, the stylus would produce a trip-indicating mark from the side of curve 18 opposite to the side from which lines 21-1 to 25-1 project. Furthermore, the invention could be practiced using both a set of normally-open and a set of normally-closed timer-controlled switches connected in parallel between, and in series with, respectively, the lines 14 and 15, together with a single, manually-operable switch for selectively enabling either set, and thus permitting an operator to select either up-scale or down-scale deflection of the stylus (relative to the "time"ordinate). This would avoid the possibility of having one of the lateral spikes running beyond the side of chart C, as for example by switching control to the series-connected set as per the upper end of curve 18 is reached — i.e., at higher test temperatures.

Having thus described my invention, what I claim is:

1. The method of checking a plurality of switches which move between open and closed positions, respectively, in response to predetermined changes in an external condition, comprising
    subjecting all of said switches to a controlled, external condition, the magnitude of which is changed over a period of time from a first to a second limit to effect movement of said switches between their open and closed positions,
    developing during said period a signal the magnitude of which at any instant is proportionate to the magnitude of said condition,
    producing a graphic record of the rate of change in the magnitude of said signal,
    momentarily interrupting said signal for different intervals of time for the different switches, respectively, each time one of said switches moves between its open and closed positions, and
    using said interruptions to mark said graphic record at the exact points thereon where said switches move between their open and closed positions.

2. The method of checking thermostatic switches which operate to move between open and closed positions, respectively, in response to different ambient temperatures, comprising
    placing said switches in a controlled temperature ambient,
    changing said ambient temperature from a first to a second value to effect operation of said switches,
    developing an electrical signal the magnitude of which at any instant is proportionate to said ambient temperature,
    using said signal automatically to prepare a record of the gradient of said ambient temperature, and
    momentarily interrupting said signal for different intervals of time for the different switches, respectively, when said siwtches move between open and closed positions to indicate on said record the temperatures at which said switches operate.

3. The method as defined in claim 2 wherein
    said signal inscribes a curve representing the rate of change of said ambient temperature,
    developing a second signal each time the first-named signal is interrupted, and
    using said second signal for inscribing a line transverse to said curve each time one of said switches is operated.

4. Apparatus for checking the operation of condition-responsive electrical switches, comprising
    a chamber for holding a plurality of said switches,
    means for simultaneously varying the magnitude of an ambient condition of all said switches,
    means for developing an electrical signal the magnitude of which varies in proportion to the variation in magnitude of said condition,
    recording means responsive to said signal to produce a graphic representation of the magnitude of said condition at any instant, and
    means for momentarily interrupting said signal for different time intervals, respectively, when different said switches operate,
    said recording means being operative to place a different mark on said graphic representation each time said signal is interrupted, said marks indicating, respectively, the magnitude of said condition at the moment a particular one of said switches operated.

5. Apparatus as defined in claim 4, wherein said interrupting means comprises
    a plurality of timer devices interposed between said recording means and said signal developing means, and
    means connecting each of said switches to a different one of said timer devices, and operative each time one of said switches is operated to energize the timer device connected thereto,
    said timer devices being operative, when energized, to effect interruption of said signal for different time intervals, respectively.

6. Apparatus for determining the temperatures at which thermostatic switches operate to move fron one to the other of their open and closed positions, respectively, comprising
    means for simultaneously subjecting a plurality of said switches to an ambient temperature which changes in value to effect operation of said switches,
    means for developing a first electrical signal having a magnitude proportionate at any instant to the value of said temperature,
    a temperature recorder responsive to said first signal to inscribe a curve representating the rate of change in the value of said temperature, and
    means connecting said switches between said recorder and said signal developing means and operative, each time one of said switches operates, to cause said recorder to inscribe transverse to said curve a line, the lengths of said lines being different for the different switches.

7. Apparatus as defined in claim 6, wherein said connecting means comprises
    a plurality of timer devices equal in number to said switches, and means connecting said switches, respectively, to different said devices and operative, when one of said switches is operated, to energize the timer device connected thereto, each of said devices being operative, when energized, momentarily to apply to said recorder a second signal having a duration which is different for each of said devices and is dependent upon the time the associated timer device is energized, said second signals being operative to cause said recorder to inscribe said transverse lines having lengths proportionate, respectively, to the durations of the signals produced by said different devices, respectively.

8. Apparatus as defined in claim 7, wherein said first signal developing means comprises a thermocouple exposed to said ambient temperature and connected by a pair of wire leads to said recorder normally to vary the magnitude of said first signal in proportion to the change in said ambient temperature, and said connecting means further comprises a second plurality of switches connected to at least one of said leads and responsive to said timer devices, each of said timer devices being operative, when energized, momentarily to move an associated one of said second plurality of switches from a first to a second position in which the last-named switch causes said second signal to be applied to said recorder for a predetermined duration, the different timer devices operating to produce said second signal for different predetermined durations, respectively.

9. Apparatus for testing the temperatures at which different thermostatic switches move from one to the other of their open and closed positions, comprising means for simultaneously subjecting a plurality of said switches to changing ambient temperature to effect operation of the switches, a temperature recorder, a thermocouple exposed to said ambient temperature, an electrical circuit operatively connecting said thermocouple to said recorder to cause recording of said varying ambient temperature, a plurality of timers, one of which is connected to each thermostatic switch, and a plurality of switches, one of which is connected to each different timer only, and each of which is connected across said electrical circuit to short out said thermocouple for a time interval determined by the associated timer, said different timers operating for different time intervals.

* * * * *